(12) United States Patent
Banerjee et al.

(10) Patent No.: US 10,481,835 B2
(45) Date of Patent: Nov. 19, 2019

(54) METHODS AND SYSTEMS FOR DYNAMIC HASHING IN CACHING SUB-SYSTEMS

(71) Applicant: NETAPP, INC., Sunnyvale, CA (US)

(72) Inventors: Arindam Banerjee, Superior, CO (US); Donald R. Humlicek, Wichita, KS (US)

(73) Assignee: NETAPP, INC., Sunnyvale, CA (US)

( * ) Notice: Subject to any disclaimer, the term of this patent is extended or adjusted under 35 U.S.C. 154(b) by 892 days.

(21) Appl. No.: 14/510,829

(22) Filed: Oct. 9, 2014

(65) Prior Publication Data

US 2016/0103767 A1    Apr. 14, 2016

(51) Int. Cl.
*G06F 3/06* (2006.01)
*G06F 12/0868* (2016.01)

(52) U.S. Cl.
CPC ............ *G06F 3/067* (2013.01); *G06F 3/0611* (2013.01); *G06F 3/0638* (2013.01); *G06F 12/0868* (2013.01)

(58) Field of Classification Search
None
See application file for complete search history.

(56) References Cited

U.S. PATENT DOCUMENTS

2010/0083039 A1*  4/2010  Chew .................. G06F 11/1076
                                                            714/6.12

* cited by examiner

*Primary Examiner* — Ann J Lo
*Assistant Examiner* — Jane Wei
(74) *Attorney, Agent, or Firm* — Haynes and Boone, LLP

(57) ABSTRACT

Methods and systems for dynamic hashing in cache subsystems are provided. The method includes analyzing a plurality of input/output (I/O) requests for determining a pattern indicating if the I/O requests are random or sequential; and using the pattern for dynamically changing a first input to a second input for computing a hash index value by a hashing function that is used to index into a hashing data structure to look up a cache block to cache an I/O request to read or write data, where for random I/O requests, a segment size is the first input to a hashing function to compute a first hash index value and for sequential I/O requests, a stripe size is used as the second input for computing a second hash index value.

21 Claims, 9 Drawing Sheets

METHODS AND SYSTEMS FOR DYNAMIC HASHING IN CACHING SUB-SYSTEMS

TECHNICAL FIELD

The present disclosure relates to caching systems, and in particular to using hashing techniques in networked storage systems.

BACKGROUND

Various forms of storage systems are used today. These forms include direct attached storage (DAS) network attached storage (NAS) systems, storage area networks (SANs), and others. Network storage systems are commonly used for a variety of purposes, such as providing multiple users with access to shared data, backing up data and others.

A storage system typically includes at least a computing system executing a storage operating system for storing and retrieving data on behalf of one or more client computing systems ("clients"). The storage operating system stores and manages shared data containers in a set of mass storage devices.

The storage system may be implemented as a clustered storage system having a plurality of nodes. The storage system can be presented to client systems as virtual storage systems.

Input/output (I/O) requests are typically used to read and write data in storage systems and may sometimes be cached by the storage system. The term caching as used herein means using a memory by a storage controller to temporarily store data before the data is persisted (or stored) at a storage device. Typically, processing of I/O requests using cache management routines comprise a significant portion of the overall I/O processing and handling. Cache management operations—such as allocating cache blocks, managing data, inserting a cache block into a hash list, and managing various dirty cache lists—are not only processor (CPU) intensive but are also important for successfully processing I/O requests. Cache management operations are resource intensive because they involve manipulating multiple lists, queues, hash tables and others during an I/O operation and maintaining cache related statistics.

In multi-processor environments, typical cache designs/operations become a bottleneck, as cache management operations often are single threaded or managed using locks. Managing cache related operations via locks can be suboptimal for I/O processing, especially in a multi-processor and multi-storage node environment because a lock causes contention (thereby increasing response times) and may in some situations invalidate a cache. Continuous efforts are being made to improve data caching, particularly with respect to multi-processor environments.

SUMMARY

In one aspect, a machine implemented method is provided. The method includes analyzing a plurality of input/output (I/O) requests for determining a pattern indicating if the I/O requests are random or sequential; and using the pattern for dynamically changing a first input to a second input for computing a hash index value by a hashing function that is used to index into a hashing data structure to look up a cache block to cache an I/O request to read or write data. For random I/O requests, a segment size is the first input to a hashing function to compute a first hash index value and for sequential I/O requests, a stripe size is used as the second input for computing a second hash index value.

In another aspect, a non-transitory, machine readable storage medium having stored thereon instructions for performing a method is provided. The machine executable code which when executed by at least one machine, causes the machine to: analyze a plurality of input/output (I/O) requests for determining a pattern indicating if the I/O requests are random or sequential; and use the pattern for dynamically changing a first input to a second input for computing a hash index value by a hashing function that is used to index into a hashing data structure to look up a cache block to cache an I/O request to read or write data. For random I/O requests, a segment size is the first input to a hashing function to compute a first hash index value and for sequential I/O requests, a stripe size is used as the second input for computing a second hash index value.

In yet another aspect, a system having a memory containing machine readable medium comprising machine executable code having stored thereon instructions is provided. A processor module coupled to the memory is configured to execute the machine executable code to: analyze a plurality of input/output (I/O) requests for determining a pattern indicating if the I/O requests are random or sequential; and use the pattern for dynamically changing a first input to a second input for computing a hash index value by a hashing function that is used to index into a hashing data structure to look up a cache block to cache an I/O request to read or write data. For random I/O requests, a segment size is the first input to a hashing function to compute a first hash index value and for sequential I/O requests, a stripe size is used as the second input for computing a second hash index value.

This brief summary has been provided so that the nature of this disclosure may be understood quickly. A more complete understanding of the disclosure can be obtained by reference to the following detailed description of the various thereof in connection with the attached drawings.

BRIEF DESCRIPTION OF THE DRAWINGS

The foregoing features and other features will now be described with reference to the drawings of the various aspects. In the drawings, the same components have the same reference numerals. The illustrated aspects are intended to illustrate, but not to limit the present disclosure. The drawings include the following Figures.

DETAILED DESCRIPTION

As a preliminary note, the terms "component", "module", "system," and the like as used herein are intended to refer to a computer-related entity, either software-executing general purpose processor, hardware, firmware and a combination thereof. For example, a component may be, but is not limited to being, a process running on a processor, a processor, an object, an executable, a thread of execution, a program, and/or a computer.

By way of illustration, both an application running on a server and the server can be a component. One or more components may reside within a process and/or thread of execution, and a component may be localized on one computer and/or distributed between two or more computers. Also, these components can execute from various non-transitory computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

Computer executable components can be stored, for example, at non-transitory, computer readable media including, but not limited to, an ASIC (application specific integrated circuit), CD (compact disc), DVD (digital video disk), ROM (read only memory), floppy disk, hard disk, EEPROM (electrically erasable programmable read only memory), memory stick or any other storage device, in accordance with the claimed subject matter.

Methods and systems for managing cache operations are provided and may operate on multiprocessor, distributed cache systems. This disclosure provides a dynamic hashing methodology to improve caching usability by identifying patterns in input/output (I/O) request operations and using that information to generate hashing index values that are then used for performing look-up operations for cache distribution. Systems that may utilize these dynamic hash functions are also described herein for context, but it will be understood that dynamic hashing can improve other caching and storage management systems similarly and may also be utilized in other, non-storage contexts.

Figure 1A:
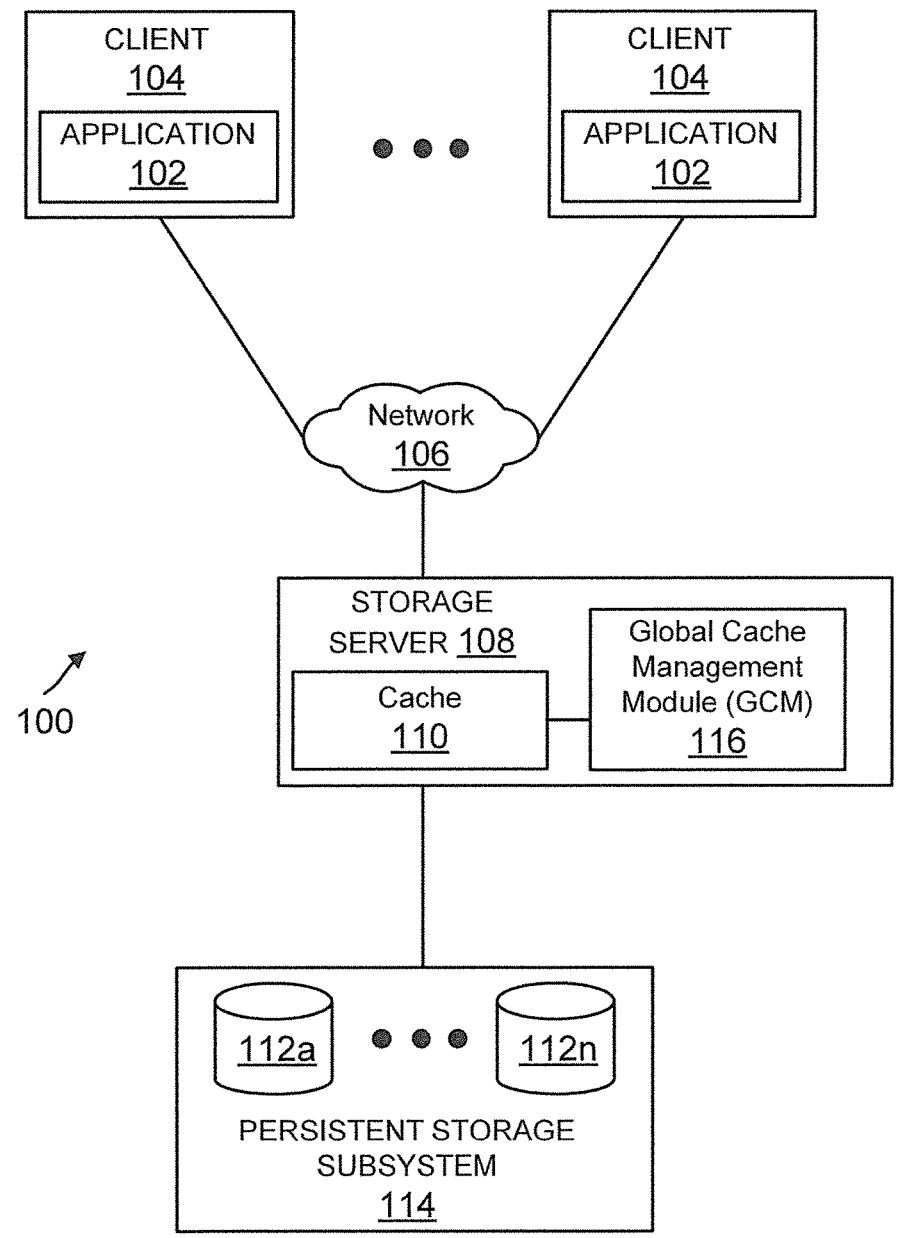
FIG. 1A provides a block diagram of an example of an operating environment for the various aspects disclosed herein.

System 100: FIG. 1A is a block diagram illustrating an example network storage system 100 (or configuration) in which the various methods and systems (may be referred to as technology) introduced herein can be implemented. The network configuration described with respect to FIG. 1A is for illustration of a type of configuration in which the technology described herein can be implemented. As would be recognized by one skilled in the art, other network storage configurations and/or schemes could be used for implementing the technology disclosed herein.

As illustrated in the example of FIG. 1A, the network storage system 100 includes multiple client systems 104, a storage server 108, and a network 106 connecting the client systems 104 and the storage server 108. The storage server 108 is coupled with a number of mass storage devices (or storage containers) 112 in a mass storage subsystem 114. Some or all of the mass storage devices 112a-112n can be various types of storage devices, e.g., hard disk drives (HDDs), flash memory, solid-state drives (SSDs), hybrid storage drives (sometimes referred to as SSHDs), optical drives, tape storage, etc. For ease of description, the storage devices 112a-112n are discussed as disks herein. However as would be recognized by one skilled in the art, other types of storage devices could be used.

Illustratively, the network 106 can be embodied as an Ethernet network, a Fibre Channel network or any other network type and may comprise a local area network (LAN), a wide area network (WAN), a storage area network (SAN), combinations of the same and the like. Each client 104 can communicate with the storage server 108 over the network 106 by exchanging packets or frames of data according to pre-defined protocols, e.g., Transmission Control Protocol/Internet Protocol (TCP/IP). It is noteworthy that clients 104 may be coupled to the storage server 108 directly without having to go through a network adapter or network 106. The various aspects described herein are not limited to a network or a direct connection.

Although illustrated as distributed systems, in some aspects the storage server 108 and the mass storage subsystem 114 can be physically contained and/or otherwise located in the same enclosure. For example, the storage system 108 and the mass storage subsystem 114 can together be one of the E-series storage system products available from NetApp®, Inc., the assignee of the present application. The E-series storage system products can include one or more embedded controllers (or storage servers) and disks. Furthermore, the storage system can, in some aspects, include a redundant pair of controllers that can be located within the same physical enclosure with the disks. The storage system can be connected to other storage systems and/or to disks within or outside of the enclosure via a serial attached SCSI (SAS)/Fibre Channel (FC) protocol. Other protocols for communication are also possible including combinations and/or variations thereof.

In another aspect, the storage server 108 can be, for example, one of the FAS-series of storage server products available from NetApp®, Inc. The client systems 104 can be connected to the storage server 108 via the network 106, which can be a packet-switched network, for example, a local area network (LAN) or a wide area network (WAN). Further, the storage server 108 can be connected to the storage devices 112a-112n via a switching fabric (not illustrated), which can be a fiber distributed data interface (FDDI) network, for example. It is noted that, within the network data storage environment, any other suitable number of storage servers and/or mass storage devices, and/or any other suitable network technologies, may be employed.

The storage server 108 can receive and respond to various read and write requests (also referred to as I/O requests) from applications 102 running on the client systems (or clients) 104, directed to data stored in or to be stored in the storage subsystem 114. The storage server 108 can make some or all of the storage space on the storage devices 112 available to the client systems 104 in a conventional manner. For example, each of the storage devices 112 can be implemented as an individual disk, multiple disks (e.g., a Redundant Array of Independent (or Inexpensive) Disks (RAID) group) or any other suitable mass storage device(s) including combinations and/or variations thereof. Storage of information in the mass storage subsystem 114 can be implemented as one or more storage volumes that comprise a collection of physical storage devices 112 cooperating to define an overall logical arrangement of volume block number (VBN) space on the volume(s). Each logical volume is generally, although not necessarily, associated with its own file system.

The storage devices within a logical volume/file system are typically organized as one or more groups, wherein each group may be operated as a RAID. Most RAID implementations, e.g., a RAID-6 level implementation, enhance the reliability/integrity of data storage through the redundant writing of data "stripes" across a given number of physical disks in the RAID group, and the appropriate storing of parity information with respect to the striped data. In computer data storage, data striping is a technique of segmenting logically sequential data, such as a file, so that consecutive segments are stored on different physical storage devices. Striping is useful when a processing device requests data more quickly than a single storage device can provide it. By spreading segments across multiple devices which can be accessed concurrently, total data throughput is increased. It is also a useful method for balancing I/O load across an array of disks. In conjunction with this, a "stripe" herein may refer to a block of data in data striping. An illustrative example of a RAID implementation is a RAID-6 level implementation, although it should be understood that other types and levels of RAID implementations may be used according to the technology described herein. One or more RAID groups together form an aggregate. An aggregate can contain one or more volumes.

Although the storage server 108 is illustrated as a single unit in FIG. 1A, it can have a distributed architecture. For example, the storage server 108 can be designed as a physically separate network module (e.g., "N-blade") and disk module (e.g., "D-blade") (not illustrated), which communicate with each other over a physical interconnect. Such an architecture allows convenient scaling, e.g., by deploying two or more N-blades and D-blades, all capable of communicating with each other through the physical interconnect.

A storage server 108 can be configured to implement one or more virtual storage servers. Virtual storage servers allow the sharing of the underlying physical storage controller resources, (e.g., processors and memory, between virtual storage servers while allowing each virtual storage server to run its own operating system) thereby providing functional isolation. With this configuration, multiple server operating systems that previously ran on individual servers, (e.g., to avoid interference) are able to run on the same physical server because of the functional isolation provided by a virtual storage server implementation. This can be a more cost effective way of providing storage server solutions to multiple customers than providing separate physical servers for each customer.

As illustrated in the example of FIG. 1A, storage server 108 includes a cache 110. The cache 110 can include, for example, a flash memory. Although illustrated in combination, cache 110 can be implemented separately from the storage server 108. Alternatively or additionally, cache 110 can be physically and/or functionally distributed.

According to one aspect, storage server 108 further includes a global cache management module 116 (may also be referred to herein as GCM 116) for managing the caching operations of storage server 108. Functionality and example organization of the global cache management module is described in more detail below.

Figure 1B:
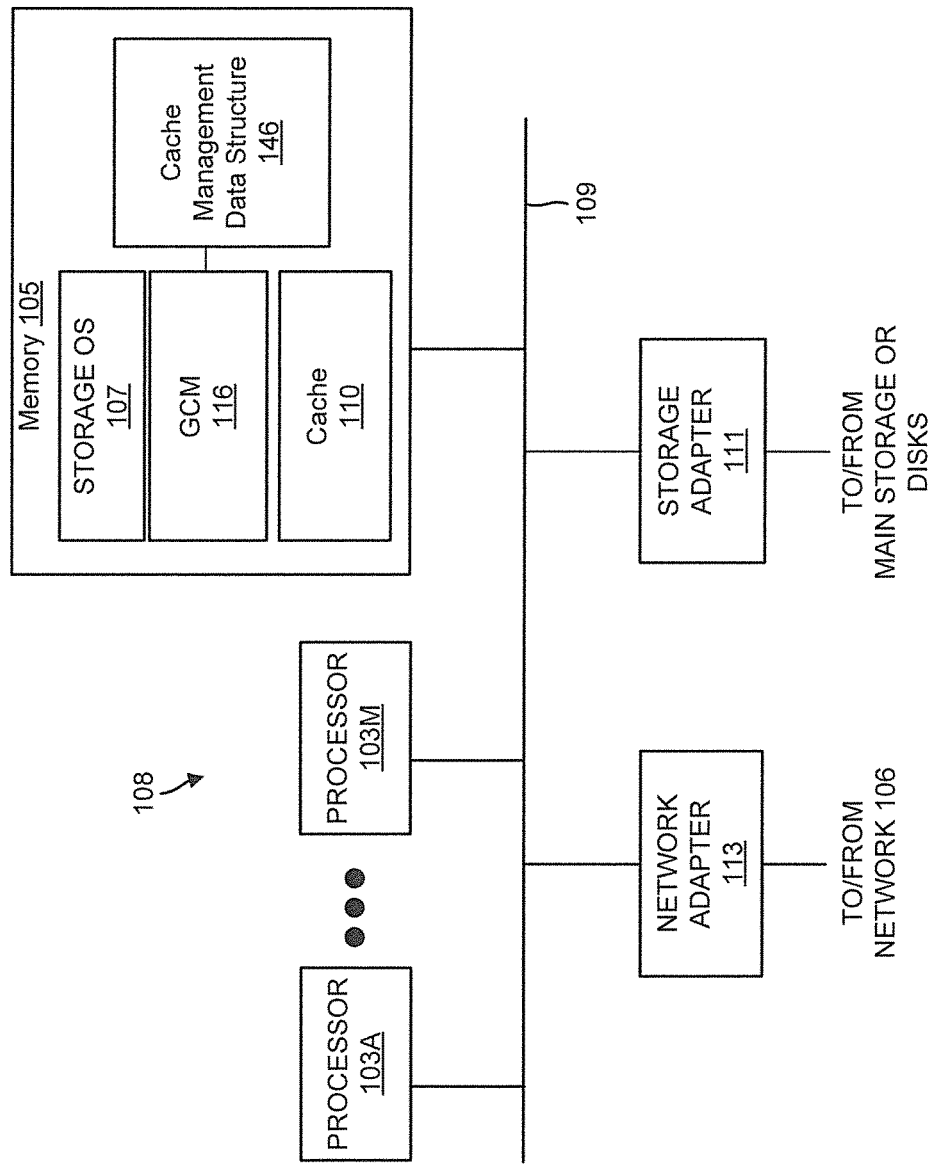
FIG. 1B provides a block diagram of an example of a storage server implementing an example of a cache system according to one aspect of the present disclosure.

Storage Server Controller: FIG. 1B is a block diagram illustrating an example of the architecture of a storage server 108 according to one aspect. The storage server is a processing system that provides storage services relating to the organization of information at storage devices 112a-112n of the mass storage subsystem 114.

In an illustrative aspect, the storage server 108 includes a processor subsystem 103 that includes one or more processors 103A-103M. The storage server 108 further includes a memory 105, a network adapter 113, and a storage adapter 111, at least some of which can be interconnected by an interconnect 109, e.g., a physical interconnect. Interconnect 109 may include a bus, for example.

The storage server 108 can be embodied as a single or multi-processor storage server executing a storage operating system 107 that preferably implements a high-level module, called a storage manager, to logically organize data as a hierarchical structure of named directories, files, and/or data "blocks" on the storage devices 112a-112n. A block can be a sequence of bytes of specified length.

The memory 105 illustratively comprises storage locations that are addressable by the processor(s) 103 and adapters 113 and 111 for storing software program code and data associated with the technology introduced here. For example, some of the storage locations of memory 105 can be used to store GCM 116 and a cache management data structure 146 used for managing cache 110 according to aspects herein. The GCM 116 and cache management data structure 146 are described below in detail.

In one aspect, memory 105 comprises volatile and/or non-volatile memory, such as Random Access Memory (RAM), flash memory, a hard disk (HDD), solid state drive (SSD), a hybrid drive (sometimes referred to as SSHD), EEPROM (electrically erasable programmable read only memory), memory stick or any other storage device. In one aspect, the memory comprises one or more SSDs as they are a non-volatile, relatively quickly accessed type of memory.

The storage operating system 107 (or firmware for a storage controller), portions of which are typically resident in memory and executed by one or more of the processing elements 103A-103M, functionally organizes the storage server 108 by (among other functions) invoking storage operations in support of the storage service provided by the storage server 108. It will be apparent to those skilled in the art that other processing and memory implementations, including various other non-transitory media, e.g., computer readable media, may be used for storing and executing program instructions pertaining to the technology introduced here. Similar to the storage server 108, the storage operating system 107 can be distributed, with modules of the storage system running on separate physical resources. In some aspects, instructions or signals can be transmitted on transitory computer readable media, e.g., carrier waves or other computer readable media.

The network adapter 113 can include multiple ports to couple the storage server 108 with one or more clients 104, or other storage servers, over point-to-point links, wide area networks, virtual private networks implemented over a public network (Internet) or a shared local area network. The network adapter 113 thus can include the mechanical components as well as the electrical and signaling circuitry needed to connect the storage server 108 to the network 106.

The storage adapter 111 cooperates with the storage operating system 107 to access information requested by clients 104. The information may be stored on any type of attached array of writable storage media, e.g., magnetic disk or tape, optical disk (e.g., CD-ROM or DVD), flash memory, SSD, HDD, SSHD, RAM, micro-electro mechanical and/or any other similar media adapted to store information, including data and parity information. However, as illustratively described herein, the information is stored on storage devices 112. The storage adapter 111 includes multiple ports having I/O interface circuitry that couples with the disks over an I/O interconnect arrangement, e.g., a conventional high-performance, Fibre Channel link topology.

The storage operating system 107 facilitates clients' access to data stored on the storage devices 112. In certain aspects, the storage operating system 107 implements a write-anywhere file system that cooperates with one or more virtualization modules to "virtualize" the storage space provided by storage devices 112a-112n. In certain aspects, a storage manager element of the storage operation system 107 logically organizes the information as a hierarchical structure of named directories and files on the storage devices 112. Each "on-disk" file may be implemented as a set of disk blocks configured to store information. As used herein, the term "file" means any logical container of data. The virtualization module(s) may allow the storage manager 410 to further logically organize information as a hierarchical structure of blocks on the disks that are exported as named logical units.

The interconnect 109 is an abstraction that represents any one or more separate physical buses, point-to-point connections, or both, connected by appropriate bridges, adapters, or controllers. The interconnect 109, therefore, may include, for example, a system bus, a form of Peripheral Component Interconnect (PCI) bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire," Fibre-Channel, Thunderbolt, and/or any other suitable form of physical connection including combinations and/or variations thereof.

GCM 116: As set forth generally above, some of the storage locations of memory 105 can be used to implement cache 110. Cache 110 generally is not visible to client systems 104 or their applications 102 but, according to an example system that may implement the disclosure aspects herein, is managed by GCM 116 to provide temporary data storage for items being read from or written to persistent storage subsystem 114. Cache 110 can be particularly helpful to reduce the number of I/O operations communicated to and from persistent storage subsystem 114, which is often made up of slower memory devices.

GCM 116, in one aspect, manages the use of cache 110 and stores information about the amount of cache blocks that are in use, the amount of data in the cache that is "dirty" (i.e., has not been written to permanent storage), and the like. In a data striping implementation, cache 110 will typically store one or more data stripes in full, and GCM 116 may help decide when to flush each data stripe. In other aspects, however, it will be understood that data blocks of various sizes may be stored in cache and flushed to persistent storage without departing from the teachings herein.

In one aspect, GCM 116 may be a part of storage operating system 107 or may comprise an application running on top of storage operating system. In one aspect, GCM 116 includes or maintains a cache management data structure 146 that facilitates management of the cache 110.

Figure 1C:
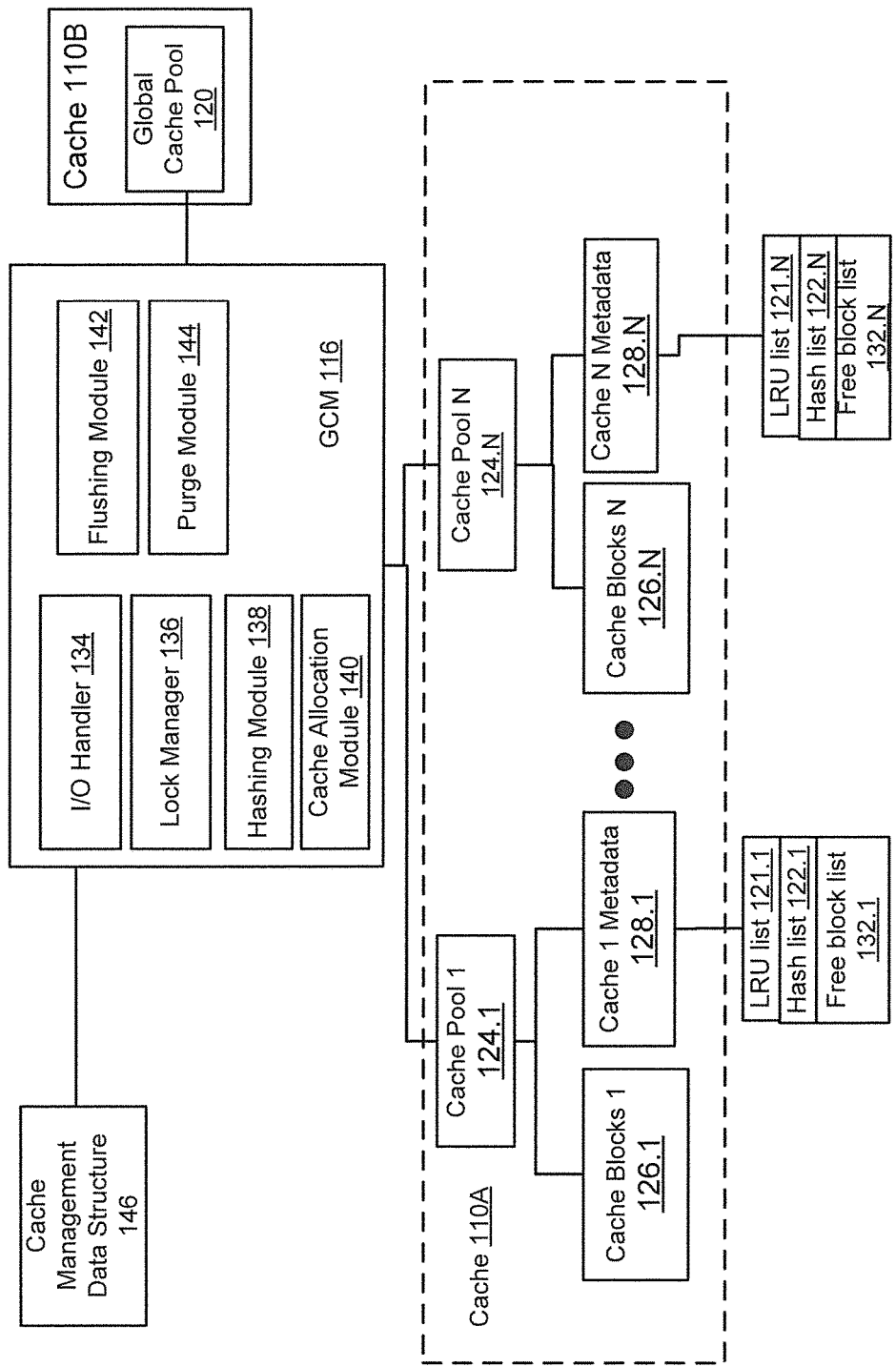
FIG. 1C provides a block diagram of a cache and cache management modules that may be used in accordance with aspects of the present disclosure.

FIG. 1C illustrates an example of cache 110 and GCM 116 structures that may be used in implementing caching methods and systems described herein. It should be noted that, in another aspect, simpler cache implementations may also be utilized in carrying out the systems and methods disclosed herein. In one aspect, all of the elements of FIG. 1C may be stored in memory 105. In one aspect, a cache 110 may comprise two parts, cache 110A and cache 110B—which may or may not comprise physically separate storage modules. According to one aspect, the cache 110A is divided up into separate cache pools 124.1-124.N, and cache 110B comprises a global cache pool 120. Each cache pool 124.$x$ in turn includes one or more associated cache blocks 126.$x$ which comprises some number of memory (or disk) sectors for storing data. In various aspects, cache blocks 126.1-126.N may comprise physical memory or may be implemented as part of a virtualized system.

Additionally, each cache pool 124.$x$ comprises or is associated with metadata 128.$x$. Metadata 128.$x$ includes information to manage the associated cache pool, such as, for example, a volume identifier that identifies a storage volume whose data is cached at a cache block, an indication of the first logical block address (LBA) that is associated with cache blocks within that cache pool, an indication of a state of cache blocks 126.$x$ (i.e. whether they are written or not), a hash table look-up node that points to a hash table/data structure (122.$x$), a least recently use (LRU) node that point to a LRU list/data structure (120.$x$), flags, a lock count, and/or a lock wait queue.

In one aspect, each cache pool 124.$x$ is also associated with a LRU list 121.$x$, a hash table 122.$x$, and a free block list 132.$x$. In one aspect, the LRU list 121.1 provides an indication of the general age of the last access of various cache blocks 126.$x$ within the cache pool 124.$x$. It is noteworthy that those that have been least recently used may be reallocated as set forth herein.

The hash-table 122.$x$ is used to look-up a cache block/cache pool for a storage volume and stripe as described below in detail.

In one aspect, the free block list 132.$x$ provides an indication of free cache blocks or memory sectors within the cache pool 124.$x$.

In one aspect, the global cache pool 120 also comprises one or more associated cache blocks which comprise some number of memory (or disk) sectors for storing data. The global cache pool 120 is not associated with any particular cache pool 124.$x$ but can loan storage resources to any cache pool 124.$x$ upon request, as will be described more fully herein.

In one aspect, the cache management data structure 146 maintains information for the GCM 116 operation and management of cache 110A, 110B. In one aspect the cache management data structure 146 stores information about the global cache pool 120 and the allocation of its cache blocks as described more fully below.

In general, according to one aspect, the GCM 116 manages cache 110A, 110B and coordinates the processing of all I/O requests and other cache management functions. According to one aspect, the GCM 116 may comprise or may coordinate the use of multiple processors (103A-M, FIG. 1B) to handle different aspects of the caching functions as described in more detail herein.

The cache 110A, 110B may comprise any suitable memory for reading and writing data. In one aspect, the memory comprises volatile and/or non-volatile memory, such as Random Access Memory (RAM), flash memory, a hard disk (HDD), solid state drive (SSD), a hybrid drive (sometimes referred to as SSHD), EEPROM (electrically erasable programmable read only memory), memory stick or any other storage device. In one aspect, the memory comprises one or more SSDs as they are a non-volatile, relatively quickly accessed type of memory.

GCM 116, according to one aspect, comprises an I/O handler 134, a lock manager 136, a hashing module 138, a cache allocation module 138, a flushing module 142, and a purge module 144. Each will be described more fully herein and as a part of U.S. patent application Ser. No. 14/510,785, commonly assigned to NetApp, Inc. and incorporated by reference herein as if fully set forth here.

Generally, I/O handler 134 may accept read and write I/O requests for handling by the GCM 116. The hashing module is described in more detail in relation to FIGS. 1D and 2A-2D. The lock manager 136 generally controls process flows where a lock or mutual exclusion may be needed. Cache allocation module 138 assists in allocating cache within a cache pool and/or where a cache pool requests cache blocks from the global cache. The flushing module 142 and the purge module 144 are generally utilized for cleaning up cache and reallocating cache blocks under appropriate circumstances.

In one aspect, the number, N, of cache pools 124.x may be related to the number, M, of processors or CPU cores available to handle caching operations. For example, in one aspect, there are more cache pools 124.x than there are processors. A greater number of cache pools increases the chances of load-balancing I/O operations (or caching I/O operations) across the pools and also decreases the chances of hot spots.

According to one aspect, GCM 116 receives I/O requests from the storage operating system 107. The I/O requests may originate from clients 104, for example. The GCM's I/O handler 134 processes every I/O request and passes it to the hashing module 138, where a hashing function is used to determine which cache pool 124.x will handle that I/O request. In one aspect, the hash function operates on the I/O requests' destination volume ID, its LBA range and other parameters. For a particular volume ID and a given LBA range, the hashing function will always hash to the same cache pool 124.x.

Further, in one aspect, GCM 116 will coordinate I/O requests that span multiple cache pools (e.g. I/O requests that are spread across multiple stripes). In such a scenario, the I/O request will be deemed complete when the I/O request processing completes across all the affected cache pools.

According to one aspect, GCM 116 will also coordinate operations that span an entire volume, such as cache purge on volume deletion (using flushing module 142). GCM 116 will also coordinate cache blocks allocated across all cache pools 124.1-N for a particular volume or volume group (VG) that includes more than one volume. In one aspect, GCM 116 oversees dirty cache threshold limits for a volume group in order to flush cache in a timely manner to maintain failover time requirements, as volume group cache blocks may span multiple cache pools 124.

In one aspect, GCM 116 loans cache blocks from the global cache pool 120 in cache block or sector chunks that are larger than a triggering I/O request's block size. In this manner, the loan likely will benefit multiple I/Os with only one fetch from the global cache pool 120.

In one aspect, loaned cache blocks will be returned to the global pool 120 once the number of free blocks in the borrowing cache pool 124.x returns above a particular threshold. For example, if the number of sectors loaned is "X," then the replenishment will occur when the number of free blocks is "Y" where Y>X.

Apart from a global threshold limit for volume groups, there may also be a per-cache pool threshold limit, according to one aspect. This may help to ensure that some number of cache blocks within a pool are reserved for completing requests for parity blocks.

According to one aspect, cache insert, search, and reclaim from LRU methods operate on a per-cache pool basis. With processes being applied on a per-pool basis, the working set of data structures, e.g. the size of free lists, LRU lists, hash tables, and the like will be much smaller as the number of cache blocks within a cache pool 124 will be a subset of the total number of cache blocks within the system. The reduction of the working set, in one aspect, may greatly reduce insert, search, and reclamation times, thereby speeding up the processes. Therefore, aspects of this disclosure may not only quicken the searches through smaller working sets, but they may also enable multiple processors or CPU cores to conduct parallel searches through their own sets of (smaller) lists.

As set forth above caching systems that incorporate the cache pool ideas are suitable for use with the further teachings of this disclosure. However, it is also important to note that simple cache implementations may also benefit from the advanced hashing techniques described below. In a system employing cache pools, it is notable that each cache pool may implement the following hashing features within the cache pool hash lists 122.x.

Figure 1D:
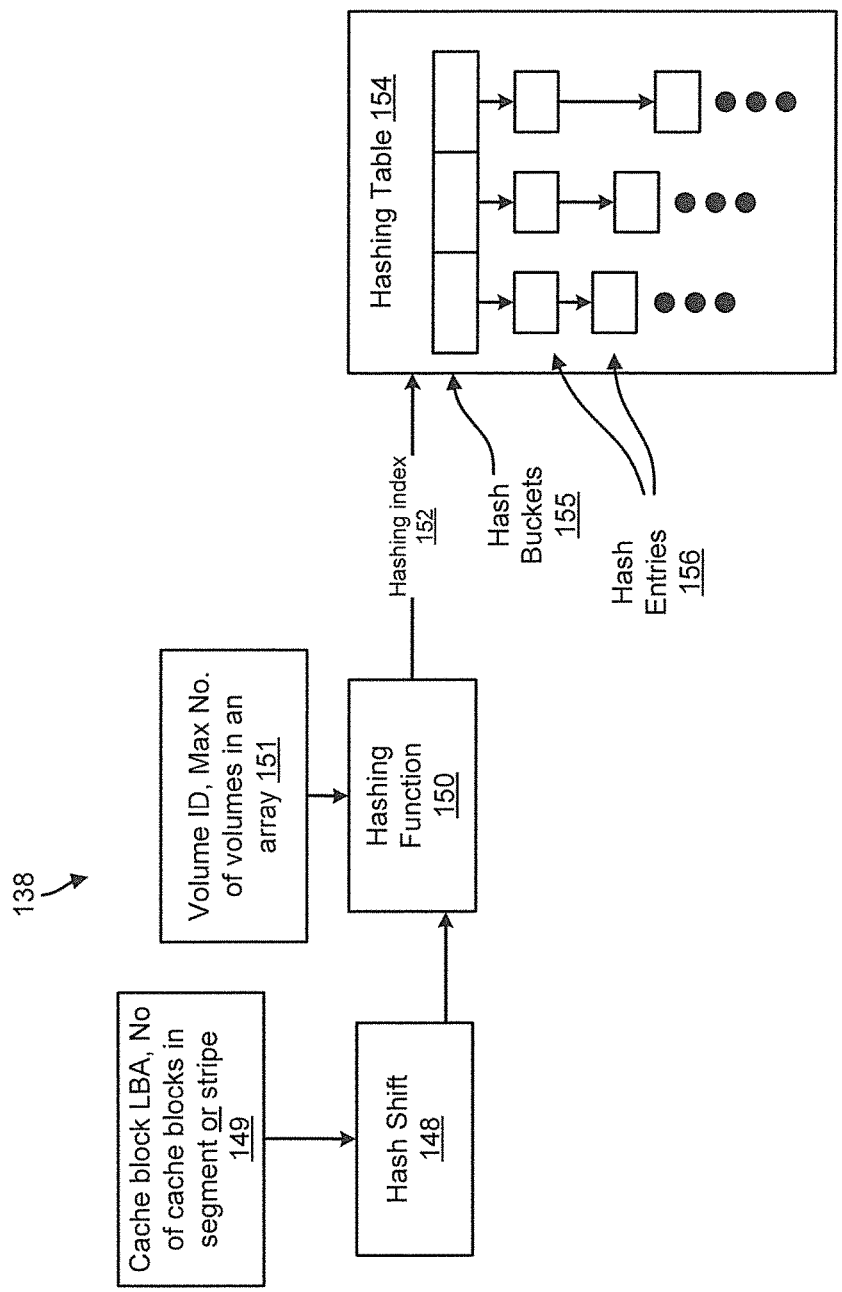
FIG. 1D illustrates an example of a hash function module according to the disclosure herein.

Hashing Features: FIG. 1D illustrates a hashing module 138. In one aspect, the cache block LBA and the number of cache blocks in a segment or stripe are used as input 149 to form a hash shift 148 which is used to help determine a hash key for input to a hashing function 150. The hashing function 150 processes the input using a hash factor 151 (which in one aspect relates to a function of volume ID and the maximum number of volumes in an array) and outputs a hashing index 152. This hashing index 152 is used to search a hashing data structure (or table) 154.

In one aspect, the hashing table 154 includes a plurality of array objects where each object includes a head of a doubly linked list (i.e. hash buckets 155). In one aspect, the hash buckets 155 point to a list of hash entries 156 which may comprise one or more cache control blocks (or CCBs), each of which contains a pointer to a cache block 126.x and cache metadata 128.x that includes the volume number, the starting LBA in the cache block, the type of data in the cache block, a bitmap that indicates which sectors in the cache block contain data, a bitmap that indicates whether the data is clean or dirty, and other metadata used to manage the cache block.

In an example, the hashing index may be derived as follows:

HashShift=(first LBA of I/O request)/(number of cache blocks in Segment or Stripe)

HashKey=HashShift*(prime number less than 2^7 to randomize)

Factor=function of volume ID and max volumes in the array

HashBuckets=a prime number<=the number of hash buckets

HashIndex=(HashKey+Factor) % HacheBuckets

In one aspect, the hash shift 148 is chosen dynamically based on analysis of the incoming I/O requests, as described more fully herein.

Process Flows: Turning now, to FIGS. 2A-2D where various process flow diagrams illustrate operation of various aspects of the disclosure herein. Starting with FIG. 2A, at block B202, GCM 116 and/or I/O handler 134 is set up to process I/O requests. At block B204, the GCM 116 and/or I/O handler 134 evaluate incoming I/O requests, extracting particular information about each I/O request. As an example, the following information may be extracted; the storage volume associated with the request, the size of the request, the LBA associated with the request.

At block B206, the GCM 116 determines whether the I/O pattern is random. The term random means that the I/O requests are not for sequential read or write operations. This is determined based on the LBAs and the storage volume associated with the I/O request.

If the I/O pattern is random, the process continues to B208 where a volume segment size is set as a variable that is used to determine a hash key (or, in one aspect, more specifically the hash shift 149) for the hashing function 150 of hashing module 138. The segment size means that the data is stored in a particular segment of a storage volume or drive and is not distributed across stripes of different storage devices.

At block B206, if the I/O pattern is not random, then the pattern is sequential. When the pattern is random, the volume segment size is used to compute the hash shift (set in block B208). The segment size is advantageous in these situations because it generally will result in fewer cache blocks per hash bucket for the I/O pattern, which reduces look-up times. It is also advantageous for read-modify-write (RMW) operations and partial write algorithms for the storage array controller because I/Os operate at a segment level. When I/Os operate at a segment level (as with RMW algorithms and Partial Write algorithms) and the segment size is used for the hash index/bucket computations, there is a high chance that most, if not all, necessary cache blocks will be found within the same hash bucket. This helps to improve processing where most or all necessary cache blocks are available through a single lookup of the cache hash table.

If the pattern is sequential, the GCM 116 sets the volume stripe size for use in the hash shift 149 (block b210). When a sequential pattern of I/O requests is detected, sequential I/Os—that are stripe aligned—result in all cache blocks for a stripe being found at the same hash bucket 155 within the hash table 154 (such as through CCBs referencing those cache blocks in one aspect). Additionally, should the hash bucket corresponding to a hash index need to be protected by a lock, the entire I/O can be processed with one lock. In either case, once a hash shift seed value is chosen in either block B208 or block B212, the process proceeds to block B214. There, the GCM 116 (in one aspect, through its hashing module 138) recomputes hash index values if needed.

In another aspect, hash functions and the hash table 154 can be changed dynamically if segment or stripe size changes in a similar manner.

Figure 2A:
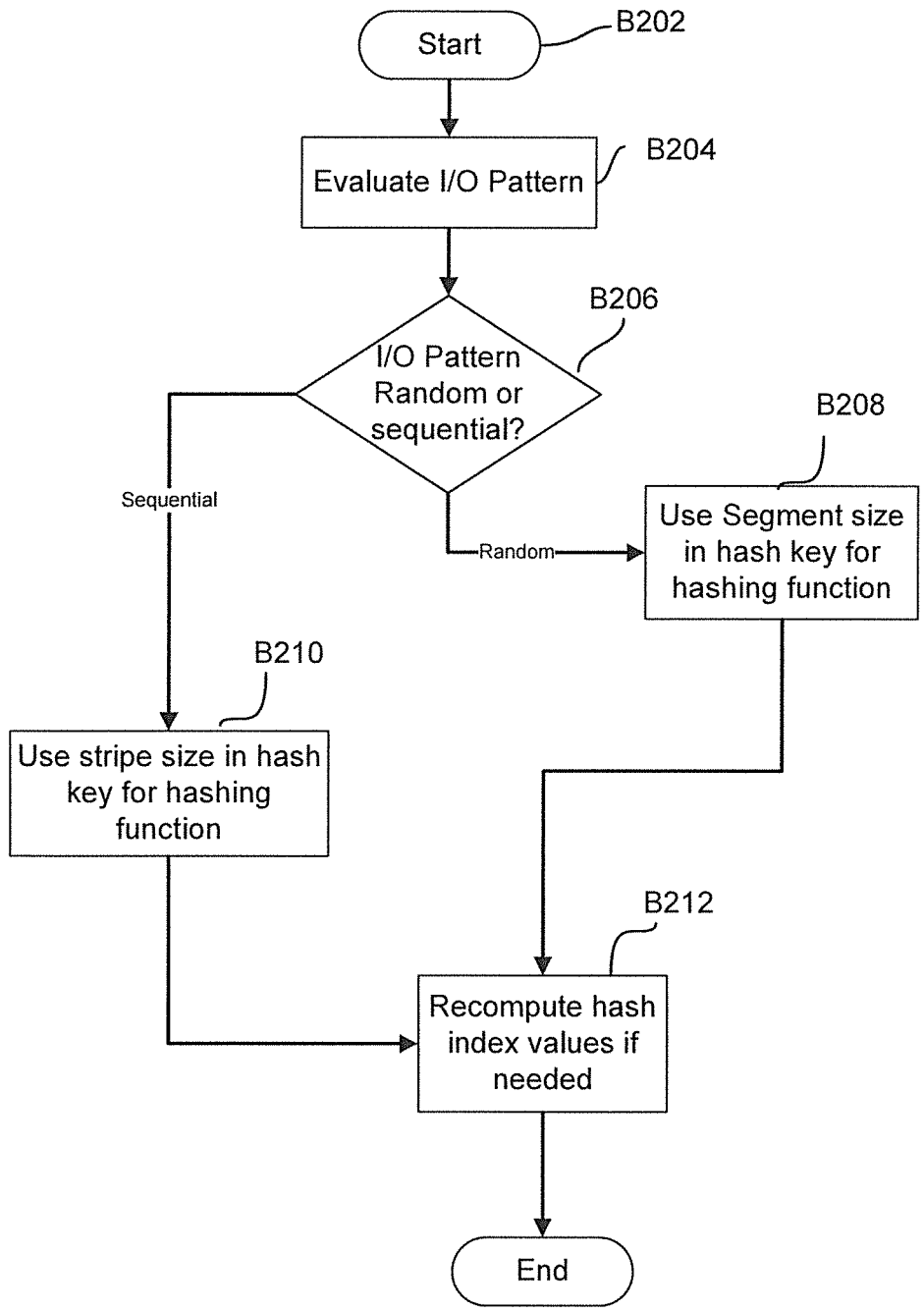
FIGS. 2A-2D show process flow diagrams, according to various aspects of the present disclosure.
Figure 2B:
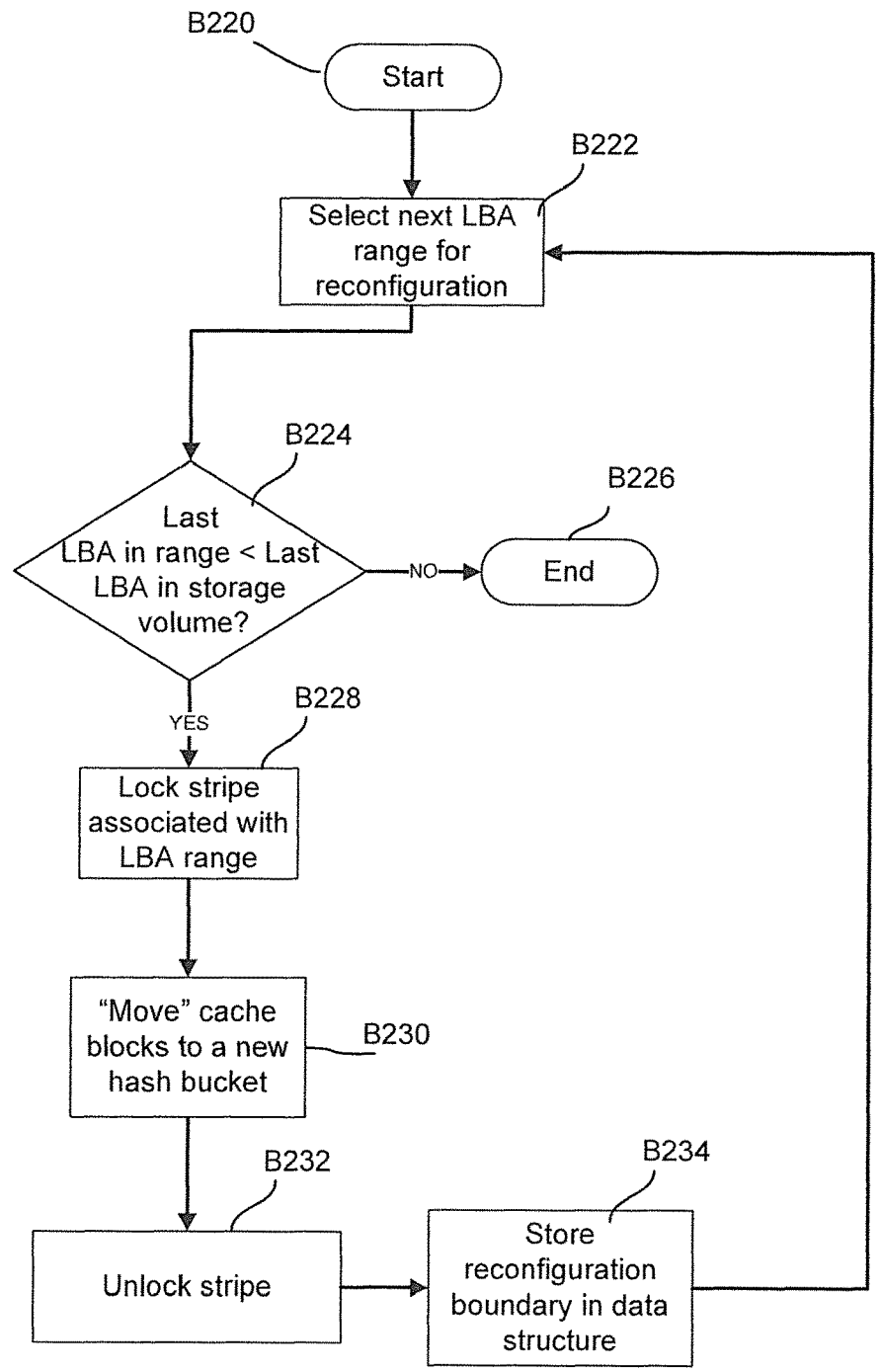

FIG. 2B illustrates an example process for recomputing a hash table dynamically. This process may be called from block B214 of FIG. 2A, for example. In one aspect, when the GCM 116 determines that its hash function should be changed, the CCBs (or cache control blocks in another aspect) stored therein may not be reconfigured all at once. In one aspect, the reconfiguration may occur when resources are free or the like. As such, some CCBs or cache blocks may be hashed under one hash function and some may be hashed under another. Accessing these cache blocks may proceed as illustrated by the process flow of FIG. 2C described below.

With respect to FIG. 2B, the process starts at block B220 after a change to the hashing function has been made by either using a segment size or stripe as an input value. In one aspect, a combination of the GCM 116's cache allocation module 140, hashing module 138, and lock manager module 136 may carry out the steps of this process.

At block B222, an LBA range is chosen for reconfiguration. At block B224, the process checks to see if the last LBA in the chosen range is less than the last LBA in the storage volume. If it is not, the process has reached the end of the storage volume and the blocks have been reconfigured and the process will end at block B226. However, if the last LBA in the selected range is less than the last LBA in the storage volume, the process continues to block B228.

At block B228, lock manager module 136 locks the stripe associated with the LBA range and other tasks that would attempt to alter or access that stripe will be held. At block B230, the cache blocks for the associated LBA range are "moved" to a new hash bucket based on the recomputed hash function 150. It will be understood that "moved" in this sense may or may not include the actual copying of cache blocks to another physical storage location. In one aspect, "moving" the cache blocks may be accomplished through updating the pointers of the CCBs found within the hash table as described above. Once the cache block or blocks are "moved," the lock manager module unlocks the stripe at block B232.

The GCM 116 also will store and/or update information about the reconfiguration boundary in the cache management data structure 146. This allows the GCM 116 and its modules to properly handle incoming I/O requests for both cache blocks that have been reconfigured and those that are still found based on the older hash table configuration, as will be shown with respect to FIG. 2C. Another advantage of this process is that it allows handling of interrupted reconfiguration operations. Interruptions can occur due to a reboot of the controller or other operations. By persisting the reconfiguration boundary, it allows an interrupted reconfiguration operation to resume from the last saved boundary.

Figure 2C:
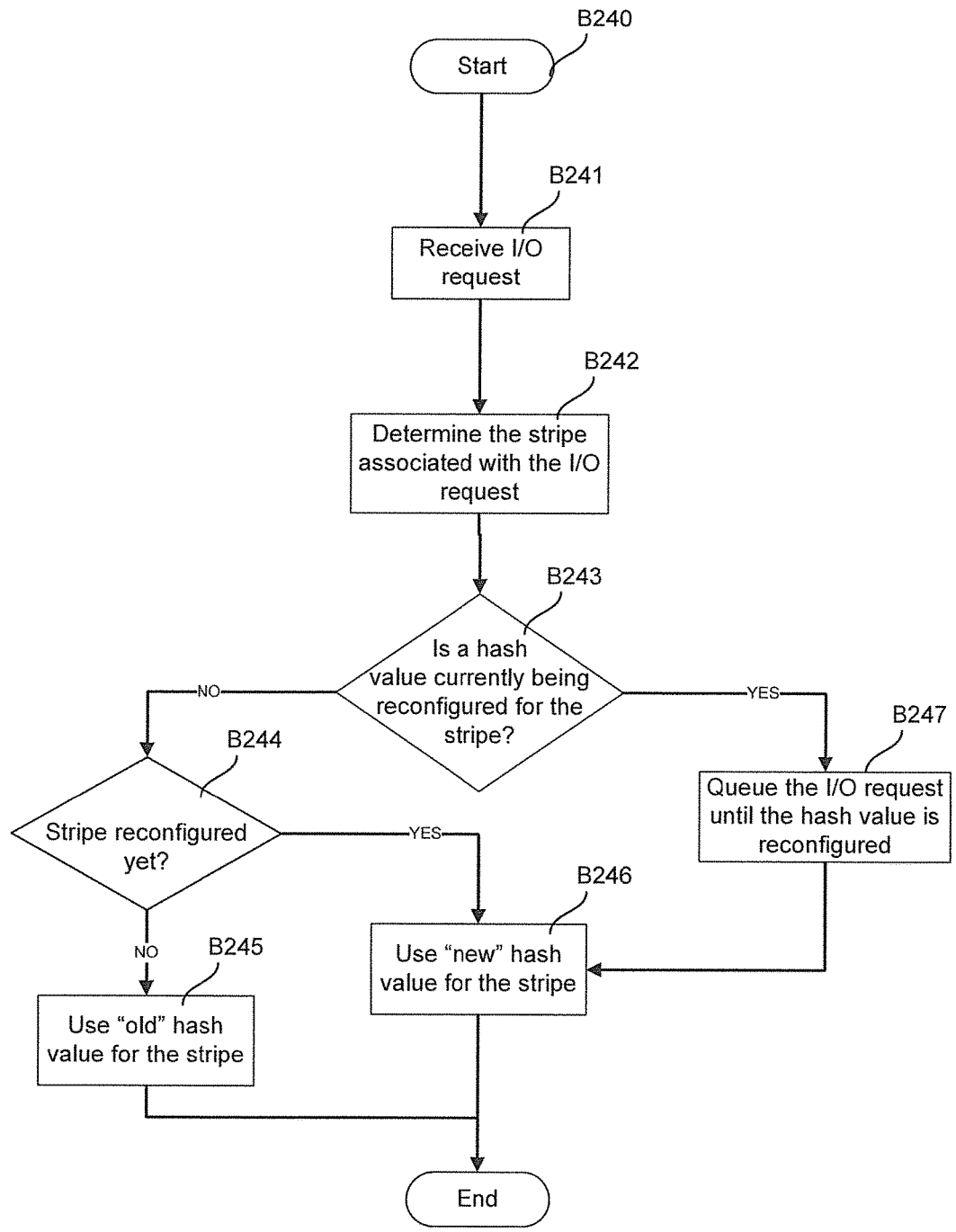

FIG. 2C then shows a process for handling I/O requests that may or may not arrive at a time when the GCM is also reconfiguring the hash table 154. Starting at block B240, GCM 116 is configured and operational to handle cache 110 and cache pools 124.1-N. At block B241, the I/O handler 134, in one aspect, receives an I/O request. At block B242, the hashing module 138 determines the stripe associated with the I/O request, which, in an aspect, can be determined by dividing the request's starting LBA by the number of LBAs in a stripe. At block B243, GCM 116 determines whether a hash value is currently being reconfigured for the stripe. This may occur through a check with the lock manager module 136, for example.

If the stripe is not currently locked, then, at block B244, GCM 116 determines if the stripe has been reconfigured yet. This may occur through a check of the cache management data structure 146 which may maintain cache configuration boundary data (as described in relation to FIG. 2B, block B234). If the stripe has not yet been reconfigured, the I/O request is processed by the hashing module 138 using the "old" hash value at block B245. On the other hand, if the stripe has been reconfigured already, then the I/O request is processed by the hashing module 138 using the "new" hash value at block B246. In this manner, dynamic hashing processes allow cache blocks to remain valid and accessible even during most of a reconfiguration process. The reconfiguration process can also be interrupted with minimal effect on the accessibility of the cache.

Returning to block B243, if the hash value is currently being reconfigured, such as for example, in the middle of a lock operation as described in FIG. 2B, blocks B228-232, then the process continues to block B247 where the I/O request is queued until the hash value is reconfigured. At block B246, after the lock is released by locking manager module 136, for example, the I/O is processed with the hashing module 138 using the new hash value.

Figure 2D:
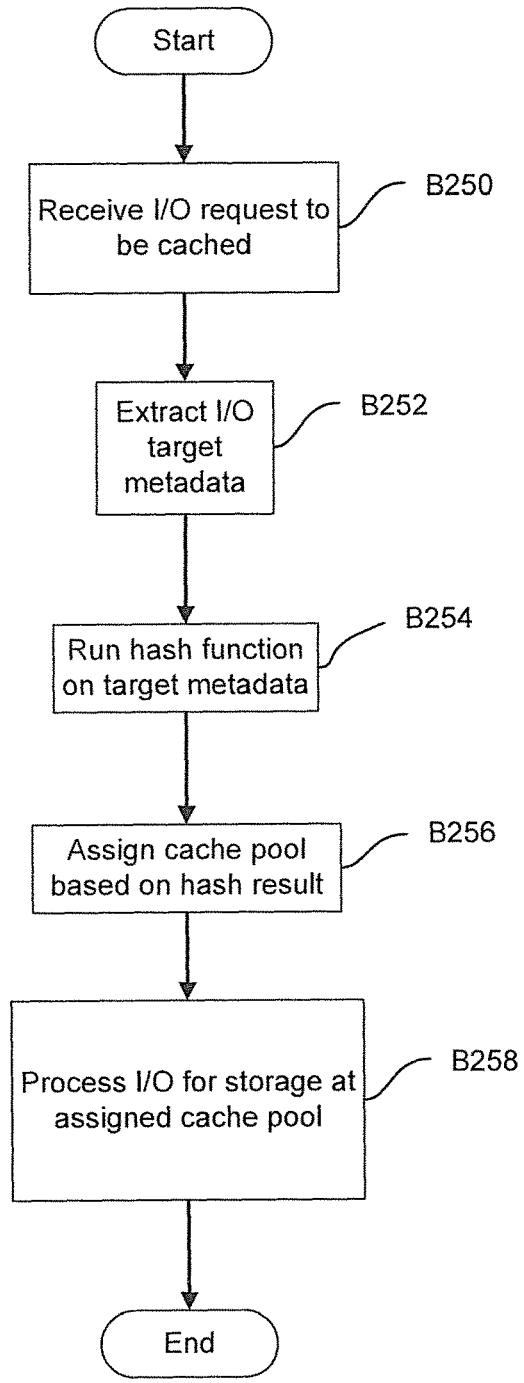

FIG. 2D illustrates a method for processing an I/O write request to be cached. At block B250, an I/O write to be cached is received in one aspect. In one aspect, an I/O write request may be handled by a storage operating system, for example, and it may determine that the I/O should be cached and hand that processing over to GCM 116 and its I/O handler 134. In another aspect, GCM 116 and/or the I/O handler 134 will intercept all I/O requests and make a determination of whether or not to cache the I/O. In yet another aspect, all I/O write requests may be cached.

At block B252, the I/O request is evaluated for target metadata, which may, in one aspect, include a target volume identifier and a LBA range, for example. At block B254, the extracted target metadata is used in a hash function (at hashing module 138) to determine which cache pool 124.x will handle the caching.

At block B256, the cache pool 124.x is assigned based on the result of the cache pool hash function. The I/O write request is then processed for storage at the assigned cache pool 124.x at block B258. This processing involves following the process of FIG. 2C within the cache pool's hash list 122.x to determine which hash function should be used to find the appropriate hash entry or entries). In an aspect, the use of cache pools may advantageously allow some cache pools to be configured for random I/O patterns and others to be configured for sequential I/O patterns. This may provide even more advantages over having to select either random or sequential dominated access for an entire cache. In one aspect, GCM 116 will assign an available processor (such as processor 103A, see FIG. 1B) to process the I/O request with respect to the assigned cache pool 124.x. In another aspect, each cache pool 124 may be assigned to set processors and all or most activities relating to that cache pool are carried out by the assigned processor.

Further, it is to be understood that a similar process may be used with I/O read requests to determine which cache pool 124.x would be assigned the requested data, which could then determine whether or not it has cached data with which to respond to the read request.

Figure 3:
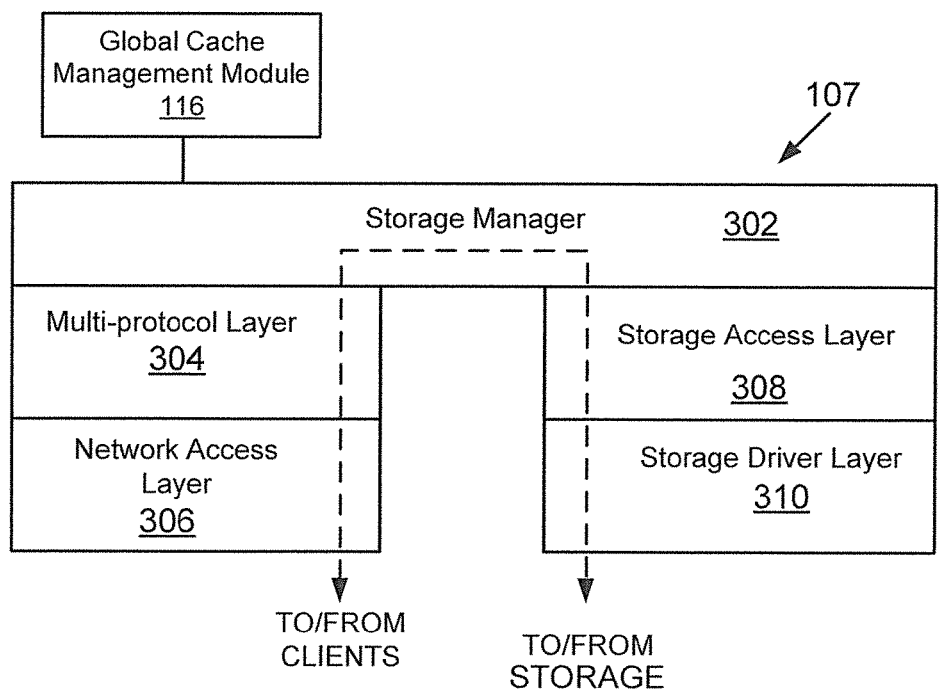
FIG. 3 shows an example of a storage operating system, used according to one aspect of the present disclosure.

With the above disclosure in mind, some additional example system details, according to one aspect are described in FIG. 3.

Storage Operating System: FIG. 3 is a schematic diagram illustrating an example of the architecture of a storage operating system 107 for use in a storage server 108. As discussed above, GCM 116 is a part of storage operating system 107 or interacts with it according to various aspects.

In some aspects, the storage operating system 107 can be the NetApp® Data ONTAP® operating system available from NetApp, Inc., Sunnyvale, Calif. that implements a Write Anywhere File Layout (WAFL®) file system (without derogation of any trademark rights). However, another storage operating system may alternatively be designed or enhanced for use in accordance with the technology described herein.

The storage operating system 107 can be implemented as programmable circuitry programmed with software and/or firmware, or as specially designed non-programmable circuitry (i.e., hardware), or in a combination and/or variation thereof. In the illustrated aspect, the storage operating system 107 includes several modules, or layers. These layers include a storage manager (or file system manager) 302, which is a functional element of the storage operating system 107. The storage manager 302 imposes a structure (e.g., one or more file systems) on the data managed by the storage server 108 and services read and write requests from clients 104.

To allow the storage server to communicate over the network 106 (e.g., with clients 104), the storage operating system 107 can also include a multi-protocol layer 304 and a network access layer 306, logically under the storage manager 302. The multi-protocol layer 304 implements various higher-level network protocols, e.g., Network File System (NFS), Common Internet File System (CIFS), Hypertext Transfer Protocol (HTTP), Fibre Channel, Infini-Band, Serial Attached Small Computer System Interface (SAS) and/or Internet small computer system interface (iSCSI), to make data stored on the storage devices 112 available to users and/or application programs. The network access layer 306 includes one or more network drivers that implement one or more lower-level protocols to communicate over the network, e.g., Ethernet, Internet Protocol (IP), TCP/IP, Fibre Channel Protocol and/or User Datagram Protocol/Internet Protocol (UDP/IP).

Also, to allow a device to communicate with a storage subsystem (e.g., storage subsystem 105 of FIG. 1A), the storage operating system 107 includes a storage access layer 308 and an associated storage driver layer 310 logically under the storage manager 302. The storage access layer 308 implements a higher-level storage redundancy algorithm, e.g., RAID-4, RAID-5, RAID-6, or RAID DP®. The storage driver layer 310 implements a lower-level storage device access protocol, e.g., Fibre Channel Protocol or SAS.

Also shown in FIG. 3 is the path 312 of data flow through the storage operating system 107, associated with a read or write operation, from the client interface to the storage interface. Thus, the storage manager 302 accesses a storage subsystem, e.g., storage system 114 of FIG. 1A, through the storage access layer 308 and the storage driver layer 310. Clients 104 can interact with the storage server 108 in accordance with a client/server model of information delivery. That is, the client 104 requests the services of the storage server 108, and the storage server may return the results of the services requested by the client, by exchanging packets over the network 106. The clients may issue packets including file-based access protocols, such as CIFS or NFS, over TCP/IP when accessing information in the form of files and directories. Alternatively, the clients may issue packets including block-based access protocols, such as iSCSI and SCSI, when accessing information in the form of blocks.

Cloud Computing: The system and techniques described above are applicable and useful in the upcoming cloud computing environment. Cloud computing means computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. The term "cloud" is intended to refer to a network, for example, the Internet for providing computing as a service.

Typical cloud computing providers deliver common business applications online which are accessed from another web service or software like a web browser, while the software and data are stored remotely on servers. The cloud computing architecture uses a layered approach for providing application services. A first layer is an application layer that is executed at client computers. In this example, the application allows a client to access storage via a cloud. After the application layer, is a cloud platform and cloud infrastructure, followed by a "server" layer that includes hardware and computer software designed for cloud specific services.

Thus, methods and systems for using hashing in a cache management system have been described. Note that references throughout this specification to "one aspect" or "one aspect" mean that a particular feature, structure or characteristic described in connection with the aspect is included in at least one aspect of the present disclosure. Therefore, it is emphasized and should be appreciated that two or more references to "one aspect" or "one aspect" or "an alternative aspect" in various portions of this specification are not necessarily all referring to the same aspect. Furthermore, the particular features, structures or characteristics being referred to may be combined as suitable in one or more aspects of the disclosure, as will be recognized by those of ordinary skill in the art.

While the present disclosure is described above with respect to what is currently considered its preferred aspects, it is to be understood that the disclosure is not limited to that described above. To the contrary, the disclosure is intended to cover various modifications and equivalent arrangements within the spirit and scope of the appended claims.

What is claimed is:

1. A machine implemented method, comprising:
analyzing a plurality of input/output (I/O) requests to determine a pattern indicating if the I/O requests are random or sequential; and
using the pattern for dynamically changing a first input to a second input for computing a hash index value by a hashing function that is used to index into a hashing data structure to look up a cache block to cache an I/O request to read or write data;
wherein for random I/O requests, a segment size is the first input to a hashing function to compute a first hash index value and for sequential I/O requests, a stripe size is used as the second input for computing a second hash index value.

2. The method of claim 1, further comprising:
reconfiguring a set of cache blocks when input to the hashing function changes from the first input to the second input;
wherein one or more of the set of cache blocks remain accessible using the first hash index value and one or more of the set of cache blocks is accessible using the second hash index value.

3. The method of claim 2, wherein the reconfiguring comprises:
selecting a Logical Block Address (LBA) range for reconfiguring a subset of cache blocks;
locking a stripe associated with the subset of cache blocks to deny access to the subset of cache blocks that are being re-configured;
associating each of the subset of cache blocks with hash buckets of the hashing data structure based on the second hash index value; and
unlocking the stripe associated with the subset of cache blocks.

4. The method of claim 3, further comprising:
tracking a reconfiguration boundary that indicates which cache blocks have been reconfigured for processing I/O requests using either the first hash index value or the second hash index value.

5. The method of claim 1, further comprising:
determining a subset of cache blocks within a set of cache blocks associated with a new I/O request; and
processing the new I/O request using the second hash index value when reconfiguration has been completed for the subset of cache blocks.

6. The method of claim 5, further comprising:
processing the new I/O request using the first hash index value, when reconfiguration has not been started for the subset of cache blocks.

7. The method of claim 6, further comprising:
queueing the new I/O request until a lock has been released indicating that reconfiguration has been completed for the subset of cache blocks.

8. A non-transitory machine readable medium having stored thereon instructions for performing a method comprising machine executable code which when executed by at least one machine, causes the machine to:
analyze a plurality of input/output (I/O) requests to determine a pattern indicating if the I/O requests are random or sequential; and
use the pattern for dynamically changing a first input to a second input for computing a hash index value by a hashing function that is used to index into a hashing data structure to look up a cache block to cache an I/O request to read or write data;
wherein for random I/O requests, a segment size is the first input to a hashing function to compute a first hash index value and for sequential I/O requests, a stripe size is used as the second input for computing a second hash index value.

9. The non-transitory machine readable medium of claim 8, wherein the instructions further cause the machine to:
reconfigure a set of cache blocks when input to the hashing function changes from the first input to the second input, where one or more of the set of cache blocks remain accessible using the first hash index value and one or more of the set of cache blocks is accessible using the second hash index value.

10. The non-transitory machine readable medium of claim 9, wherein the reconfiguration comprises:
selecting a Logical Block Address (LBA) range for reconfiguring a subset of cache blocks;
locking a stripe associated with the subset of cache blocks to deny access to the subset of cache blocks that are being re-configured;
associating each of the subset of cache blocks with hash buckets of the hashing data structure based on the second hash index value; and
unlocking the stripe associated with the subset of cache blocks.

11. The non-transitory machine readable medium of claim 10, wherein the reconfiguration further comprises:
tracking a reconfiguration boundary that indicates which cache blocks have been reconfigured for processing I/O requests using either the first hash index value or the second hash index value.

12. The non-transitory machine readable medium of claim 8, wherein the instructions further cause the machine to:
determine a subset of cache blocks within the set of cache blocks associated with a new I/O request; and
process the new I/O request using the second hash index value when reconfiguration has been completed for the subset of cache blocks.

13. The non-transitory machine readable medium of claim 12, wherein the instructions further cause the machine to:
process the new I/O request using the first hash index value, when reconfiguration has not been started for the subset of cache blocks.

14. The non-transitory machine readable medium of claim 13, wherein the instructions further cause the machine to:
queue the new I/O request until a lock has been released indicating that reconfiguration has been completed for the subset of cache blocks.

15. A system comprising:
a memory containing machine readable medium comprising machine executable code having stored thereon instructions; and
a processor coupled to the memory, the processor configured to execute the machine executable code to cause the processor to:
analyze a plurality of input/output (I/O) requests to determine a pattern indicating if the I/O requests are random or sequential; and
use the pattern for dynamically changing a first input to a second input for computing a hash index value by a hashing function that is used to index into a hashing data structure to look up a cache block to cache an I/O request to read or write data;
wherein for random I/O requests, a segment size is the first input to a hashing function to compute a first hash index value and for sequential I/O requests, a stripe size is used as the second input for computing a second hash index value.

16. The system of claim 15, wherein the processor further executes the machine executable code to:
reconfigure a set of cache blocks when input to the hashing function changes from the first input to the second input, where one or more of the set of cache blocks remain accessible using the first hash index value and one or more of the set of cache blocks is accessible using the second hash index value.

17. The system of claim 16, wherein the reconfiguration comprises:
selecting a Logical Block Address (LBA) range for reconfiguring a subset of cache blocks;
locking a stripe associated with the subset of cache blocks to deny access to the subset of cache blocks that are being re-configured;
associating each of the subset of cache blocks with hash buckets of the hashing data structure based on the second hash index value; and
unlocking the stripe associated with the subset of cache blocks.

18. The system of claim 17, wherein the reconfiguration further comprises:
tracking a reconfiguration boundary that indicates which cache blocks have been reconfigured for processing I/O requests using either the first hash index value or the second hash index value.

19. The system of claim 15, wherein the processor further executes the machine executable code to:
determine a subset of cache blocks within the set of cache blocks associated with a new I/O request; and
process the new I/O request using the second hash index value when reconfiguration has been completed for the subset of cache blocks.

20. The system of claim 19, wherein the processor further executes the machine executable code to:
process the new I/O request using the first hash index value, when reconfiguration has not been started for the subset of cache blocks.

21. The system of claim 20, wherein the processor further executes the machine executable code to:
queue the new I/O request until a lock has been released indicating that reconfiguration has been completed for the subset of cache blocks.

* * * * *